United States Patent
Bayze

[15] 3,678,658
[45] July 25, 1972

[54] AIR POLLUTION CIRCULATION DEVICE

[72] Inventor: Thomas F. Bayze, 731 W. Tennessee, Tucson, Ariz. 85714

[22] Filed: June 22, 1970

[21] Appl. No.: 48,123

[52] U.S. Cl. .................................. 55/230, 55/247, 55/257, 55/267, 55/313, 55/338, 261/92
[51] Int. Cl. ........................................ B01d 50/00
[58] Field of Search .......................... 55/DIG. 30, 230–232, 55/245, 247, 257, 267, 268, 269, 310, 313, 432, 338, 339; 261/90, 92, 21, 22; 23/277 C; 60/30 L

[56] References Cited

UNITED STATES PATENTS

| | | | |
|---|---|---|---|
| 1,302,281 | 4/1919 | Bates, Jr. | 261/92 |
| 2,040,700 | 5/1936 | Magaton | 55/230 |
| 2,096,484 | 10/1937 | Farmer | 55/313 |
| 2,521,541 | 9/1950 | Schneible et al. | 23/277 C |
| 2,531,343 | 11/1950 | Patterson | 55/267 |
| 2,852,239 | 9/1958 | Vicard | 55/338 |
| 2,922,489 | 1/1960 | Hollingsworth | 55/232 |
| 3,032,968 | 5/1962 | Novak et al. | 60/30 L |
| 3,578,294 | 5/1971 | Chruniak | 261/90 |

*Primary Examiner*—Bernard Nozick
*Attorney*—Warren F. B. Lindsley

[57] ABSTRACT

An apparatus for treating and purifying combustion products from exhaust gases before they are admitted to atmosphere by recirculation of the gases during which time they are washed and rewashed, dried and redried until solid contaminants and water soluble substances are removed from the gases.

1 Claim, 3 Drawing Figures

Patented July 25, 1972

INVENTOR.
THOMAS F. BAYZE

BY *Warren F. B. Lindsley*

ATTORNEY 3,678,658

AIR POLLUTION CIRCULATION DEVICE

BACKGROUND OF THE INVENTION

This invention relates generally to an apparatus for removing air polluting contaminants including condensable vapors from exhaust gases. From prior studies it is well known that sulfur oxide in the atmosphere reduces visibility, causes corrosion, destroys fabrics, damages vegetation, and causes an increase in cardio-respiratory disease in man. Vapors from smelting furnaces and automobile crankcases and the emission of hydrocarbons and carbon monoxide from the automobile exhaust pipe add to the air pollution problem. Thus, it is desirable that solid contaminants and noxious gases be prevented from entering the atmosphere.

1. Field of the Invention

This invention is particularly directed to a method and apparatus for treating and purifying air wherein recirculation of the air occurs until a substantial amount of the hydrocarbons and noxious gases are removed from the air before being readmitted to the atmosphere.

2. Description of the Prior Art

Condensers for smelter furnaces which are arranged to precipitate solid particles and condensation of the metallic and other vapors contained in the smelter fumes have used deflecting means for the heavy and coarse solid particles, separators for the lighter and finer particles and a plurality of washing and precipitating devices containing suitable liquids for washing the fumes. Sudden chilling or thermal shocking of waste gases by means of liquid nitrogen or another inert gas sprayed into an ascending stream of such waste gases rising against a descending water spray have been known. None of the devices have been satisfactory for cleaning and purifying the air from smelter furnaces and automobile exhausts when it is desirable to remove gas pollution such as sulfur dioxide, carbon monoxide and the like air contaminators.

SUMMARY OF THE INVENTION

In accordance with the invention claimed a new and improved apparatus for and method of treating and purifying air has been provided. This apparatus and method employs a recirculation system similar to the recirculation system of the human body for purifying the contaminated air from the furnace and automobile exhausts.

The apparatus utilizes a water or liquid solution treatment of the air repetitively with a repetitive drying and condensing out of the liquid solvable materials before exhausting to atmosphere the cleaned air or flue gases.

It is, therefore, one object of this invention to provide a new and improved apparatus and recirculation method for washing and drying contaminated fumes before discharging to atmosphere.

Another object of this invention is to repetitively wash the exhaust gases of a furnace and then dry and condense out the solvable materials and then repeat the same process before discharging the gases to atmosphere.

A further object of this invention is to provide a new and improved repetitive gas fume treating method and apparatus wherein at least a part of the cool treated gases are used to cool the newly discharged furnace gases into the apparatus.

A still further object of this invention is to provide a continuous recirculation system for treating gases which repetitively washes and dries the gases until the solvable gas ingredients are removed from the air.

Further objects and advantages of this invention will become apparent as the following description proceeds and the features of novelty which characterize this invention will be pointed out with particularity in the claims annexed to and forming part of this specification.

DESCRIPTION OF PREFERRED EMBODIMENT

Figure 1:
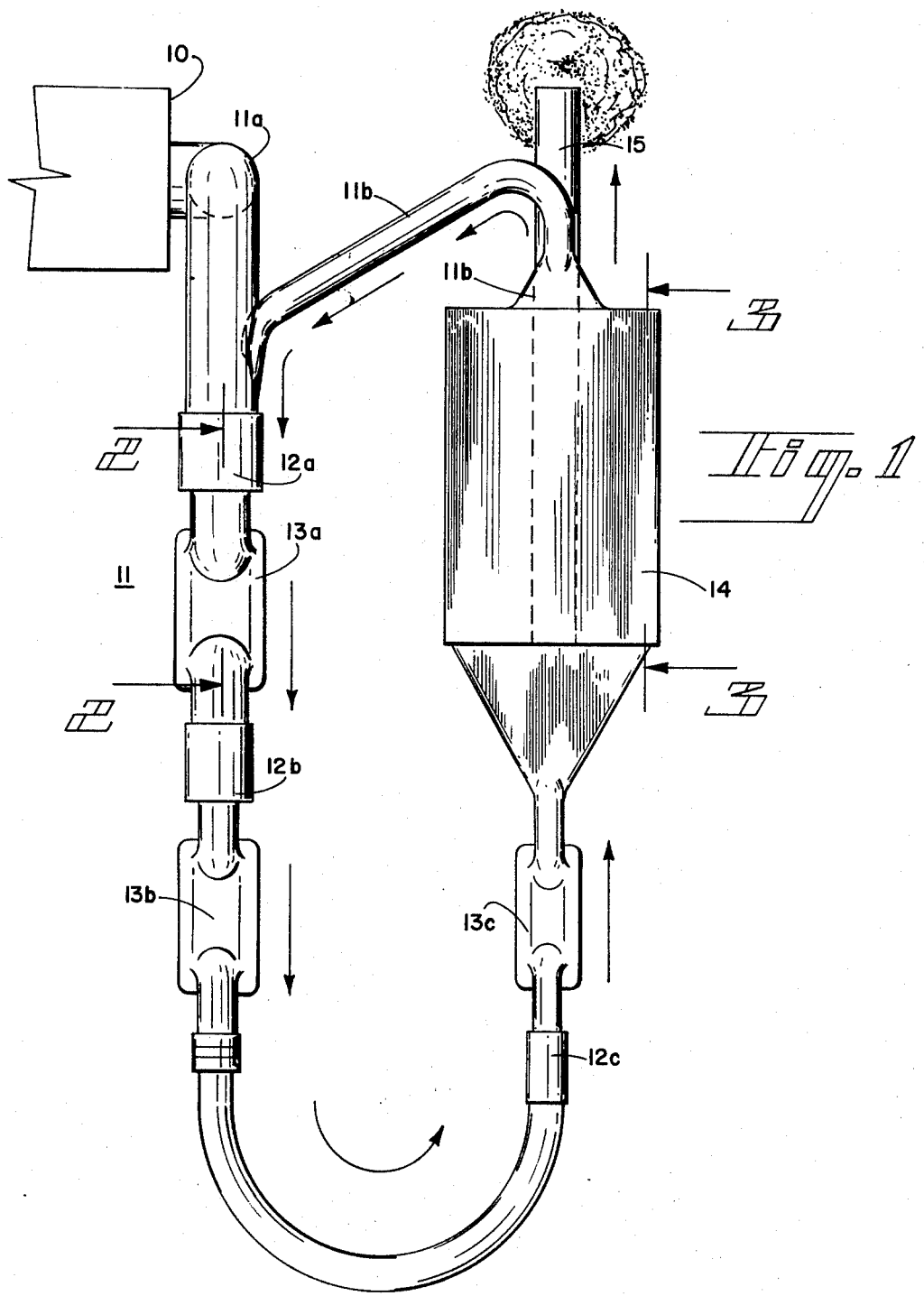
FIG. 1 illustrates a plan view of a smelter furnace connected to a recirculation apparatus including a plurality of water agitators and a drying chamber and employing the invention.

Referring more particularly to the drawing by characters of reference FIG. 1 discloses the upper end of a furnace such as a smelter furnace 10 which is connected to a smoke recirculation duct or device 11 having an inlet portion 11a and an outlet portion 11b. The recirculation device 11 comprises a plurality of vacuum or low pressure zones 12a, 12b and 12c which draw the smoke through the system. Adjacent each low pressure zone 12a, 12b and 12c are water agitators 13a, —b and 13c, respectively.

Immediately following the last agitator 13c is a smelter mill dryer and solid particle collector 14. The exhaust of a first path through it is connected back again to the low pressure zone 12a.

The smelter mill dryer and solid particle collector 14 is also provided with an exhaust 15 for discharging the clean gases from the furnace to atmosphere.

Figure 2:
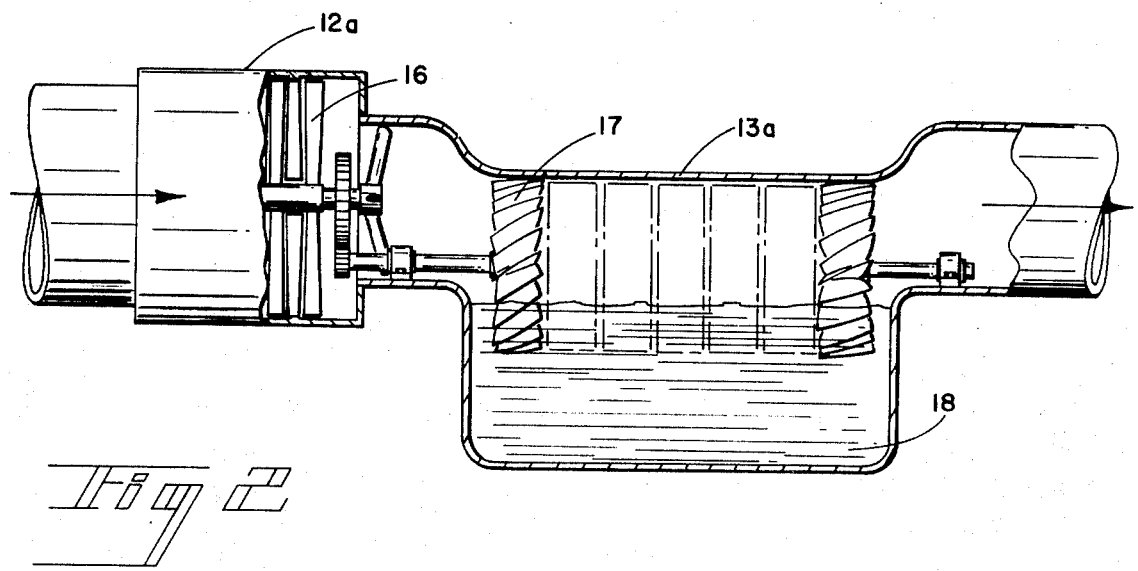
FIG. 2 is a cross sectional view of FIG. 1 taken along the line 2 — 2.
Figure 3:
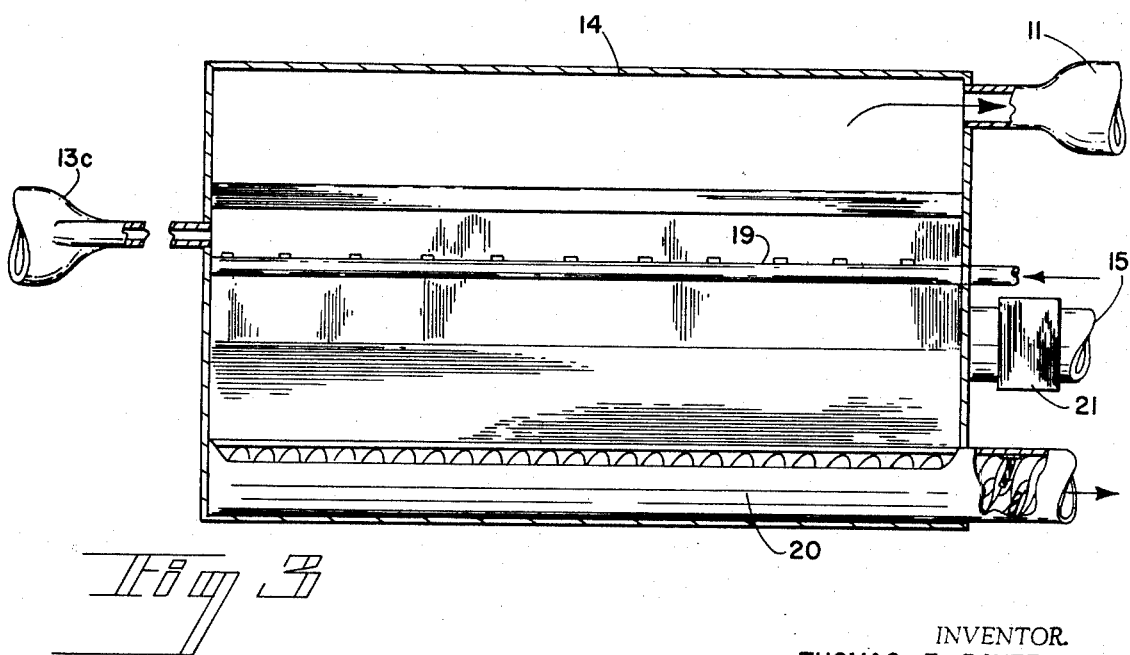
FIG. 3 is a cross sectional view of FIG. 1 taken along the line 3 — 3.

FIG. 2 illustrates one possible structure for the vacuum zones 12a, 12b and 12c wherein the smoke is drawn into the vacuum zone by a plural blade exhaust fan 16 which is geared to drive a water or other suitable wash solution agitator 17. The water or other solution 18 is collected in a lower portion of the chamber for cooling and re-intermixing with the hot flue gases. The agitators 17 may act as a paddle wheel or turbine for picking up the water and mixing it with the hot flue gases causing a turbulence which aids in dissolving into the solution the flue smoke ingredients.

Although not shown the water 18 in zone 13a may be circulated through a drain or sump arrangement so that it may be periodically replaced thereby draining off the dissolved smoke ingredients.

After the smoke has been treated and cooled down in zones 12a and 13a it is drawn into a second low pressure zone 12b and agitator 13b of the same or similar type of structure as shown in zone 12a and in agitator 13a.

The smoke is treated again in the same manner as in the prior agitator except now it is a little cooler. Where the smoke may have been at a temperature of 500° F in agitator 13a it may be only half that temperature in agitator 13b.

The smoke after being washed twice in agitators 13a and 13b is again drawn into vacuum zone 12c and then directed into agitator 13c. The vacuum zone 12c and agitator 13c are of the same structure as the structure shown and described in zones 12a and 13a. The gases are again washed and cooled further and at this time they are directed into a suitable smelter mill dryer and solid particle collector 14 wherein a gas burner 19 drys the gases and the solid particles are collected and driven out of the collector to a bin (not shown) by a suitable means such as a worm gear 20.

The gases discharged from the smelter dryer and solid particle collector are again recirculated back to vacuum zone 12a and agitator 13a where they are again mixed with new gases from the furnace 10. The recirculated gases tend to cool the hot new gases from the flue of the furnace.

In order to relieve the gases being built up in the system an exhaust 15 is connected to particle collector 14. This exhaust has a safety pressure valve 21 of any well known type arranged along its length to exhaust to atmosphere gases in the particle collector when the pressure in the collector reaches a predetermined value. Thus, the system will not be choked by back pressure being built up in the recirculating system of device 11.

It should be recognized as within the scope of this invention to use different solutions of washing liquids in each of the zones 13a, 13b and 13c. For example, the solutions could be identified for washing various ingredients out of the flue gases of the furnaces such as acid and water washes.

Although but one embodiment of the present invention has been illustrated and described, it will be apparent to those skilled in the art that various changes and modifications may be made therein without departing from the spirit of the invention or from the scope of the appended claims.

What I claim is:

1. A recirculation device for air purification comprising in combination:

a duct structure having an inlet portion for receiving exhaust gases and an outlet portion for directing said gases therefrom, a plurality of low pressure zones spacedly arranged along said duct structure, said low pressure zones each comprising an exhaust fan for moving said gases through said duct structure, a plurality of gas agitators, one positioned downstream of each of said low pressure zones, each of said gas agitators comprising a container for a liquid solution and a rotating wheel at least partially submerged in the liquid solution, means for connecting one of the wheels to each of the fans for driving said wheels upon energization of said fans, liquid solutions arranged in each of said containers of said agitators for washing said gases during the turbulence created by the rotation of said wheels of said agitators, to cool the gases and removing solid particles and liquid soluble gas contaminates from the gases, a dryer and solid particle collector comprising a part of said duct downstream from the last agitator, means for recirculating the cooled and washed gases at the outlet portion of said duct back to said inlet portion of said duct for recirculating with new exhaust gases, and a pressure release valve connected to said collector for releasing to atmosphere cooled and washed gases, said pressure release valve opening when the pressure build up in said collector is above the pressure at said inlet portion of said duct.

* * * * *